(No Model.)

A. T. MORROW.
OIL FILTER.

No. 572,814. Patented Dec. 8, 1896.

Witnesses.
Fred Clarke
W. J. McMillan

Inventor.
A. T. Morrow
by
Ridout & Maybee
Attys

UNITED STATES PATENT OFFICE.

ALLAN THOMAS MORROW, OF HAMILTON, CANADA.

OIL-FILTER.

SPECIFICATION forming part of Letters Patent No. 572,814, dated December 8, 1896.

Application filed September 11, 1895. Serial No. 562,182. (No model.)

*To all whom it may concern:*

Be it known that I, ALLAN THOMAS MORROW, distiller, residing at the city of Hamilton, in the county of Wentworth and Province of Ontario, Canada, have invented certain new and useful Improvements in Oil-Filters, of which the following is a specification.

The object of my invention is to provide an oil-filter which will purify and clarify oil, which may be used for lubricating and other purposes, and which will effectually remove all foreign and gritty particles therefrom in such manner that machine-oil may be used over and over again after passing through this device; and it consists, essentially, of an unfiltered-oil reservoir, containing a filter of sawdust and absorbent cotton, superimposed on a series of filtering-chambers placed on top of each other, the latter being supplied with water, perforated false bottoms, and filters containing animal charcoal and absorbent cotton, so that the oil, which is introduced at the bottom of a filtering-chamber by means of an oil-pipe communicating with an upper filtering-chamber or the unfiltered-oil reservoir, may be forced to pass upward through the perforations in the false bottom, and thus be broken up into globules or small particles as it rises through the water and thence through the filter to the top of the chamber, from whence it descends by an oil-pipe to the bottom of the next subjacent filtering-chamber containing a similar perforated false bottom and filter, to undergo a similar clarifying process, until finally the filtered oil, which is now fit for use, is gathered in the upper portion of the lower filtering-chamber, from whence it may be drawn. A regulating-valve and gages and oil-cocks and water-cocks are also supplied for the proper working of the device, as hereinafter more specifically described.

Figure 1:
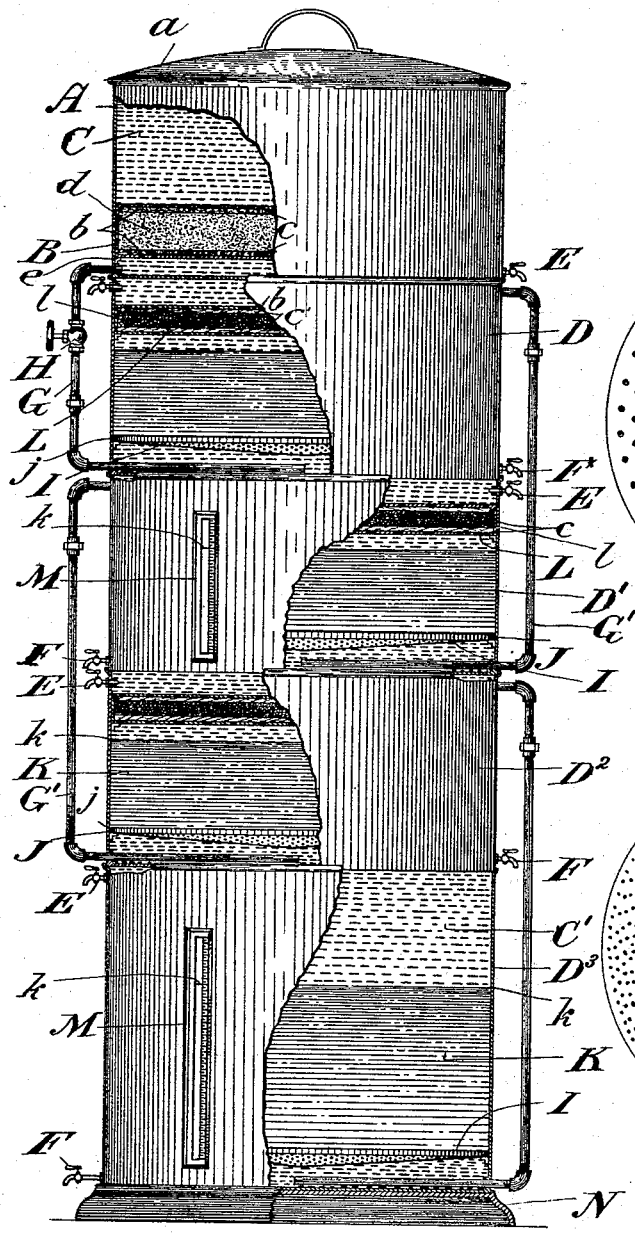
Figure 2:
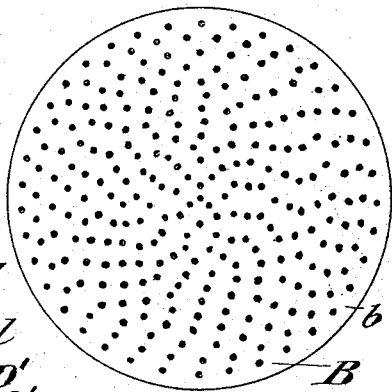
Figure 3:
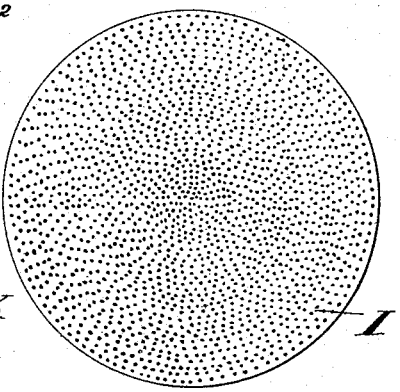

Figure 1 is an elevation of the oil-filter, partly in section, portions of each of the chambers being broken away so as to expose the interiors thereof. Fig. 2 is a plan of the perforated top and bottom of the filters. Fig. 3 is a plan of the perforated false bottom.

Like letters indicate similar parts in the different figures.

In Fig. 1 A is an unfiltered-oil reservoir in which the oil to be clarified is poured, and $a$ is the cover thereof. B is a sawdust filter resting on a ledge $e$ near the bottom of this reservoir, so as to leave a space between the bottom of the filter and the bottom of the reservoir itself. $b$ is the perforated top and bottom for this filter, which is indicated in Fig. 2; $c$, pieces of absorbent cotton placed above and below the sawdust $d$ within the filter. C is the oil undergoing the process of clarifying. C' is the oil in its final filtered and clarified condition in the bottom chamber $D^3$. D' $D^2$ $D^3$ are a series of filtering-chambers fitted one on top of each other in the usual manner, the large reservoir A fitting into the top of the filtering-chamber D.

E are oil-taps. The oil-tap in the unfiltered reservoir is located at the bottom of the reservoir, while the oil-taps in the filtering-chambers are located in the upper portion thereof, so as to be able to draw off the oil which rests on the top of the water contained in these filtering-chambers.

F are water-taps located in the bottom of the filtering-chambers in order to draw off water therefrom when necessary.

G is an oil-pipe between the bottom of the unfiltered-oil reservoir A and the bottom of the subjacent filtering-chamber D. This oil-pipe is supplied with a regulating-valve H to regulate the flow of the unfiltered oil from the reservoir. The discharge end of this oil-pipe G is located at the bottom of the filtering-chamber D at the center thereof and immediately below the perforated false bottom I. Each of these filtering-chambers D' $D^2$ $D^3$ is supplied with a false bottom I, which is flaring or cone-shaped in form, and the plan view thereof is shown in Fig. 3. These perforated false bottoms rest on ledges $e$, located near the bottom of each of these filtering-chambers so as to leave a space between the bottom of the filtering-chamber and the bottom of the perforated false bottom.

J is a packing-ring, and $j$ is packing adjacent to the perforated false bottom I, so as to prevent oil in any quantities from passing up the sides of the interior of the filtering-chambers. The object of these perforated false bottoms I is to break up the oil, so that it may rise through the perforated false bottom in globules or small particles through the water to the charcoal filter L. This charcoal filter L rests on ledges $e$ near the top of each filtering-chamber, and contains, preferably, animal charcoal $l$, which is granulated and covered above and below by pieces of absorbent cotton $c$.

As the oil is broken up into particles it rises through the water K, which is placed in each of the filtering-chambers and is thus more readily cleansed from its impurities. After passing through and rising through the charcoal filter L, a large portion of the impurities have been left behind, and the oil is then in a fit state to descend to the next adjacent filtering-chamber or the lowest filtering-chamber, from which it may be drawn for use. It undergoes a similar clarifying process in each of the filtering-chambers, except that in the lower chamber the animal-charcoal filter L may be dispensed with.

M are gages on each of the filtering-chambers, so as to indicate the respective levels of the oil and water within the chamber, and $k$ is the water-line, which is indicated on the face of the gage as well as within the interior of the chamber.

N is a stand of ordinary construction supplied with a rim in which the filter may rest.

Although I consider that the sawdust filter and the animal-charcoal filter are the best to make use of, yet I do not wish to confine myself to filters of this class, as equivalent material or filters may be used through which the oil may be filtered.

The mode of operation is as follows: After the unfiltered oil which is to be cleansed is poured into the upper unfiltered reservoir A it descends by gravity through the sawdust filter B to the bottom of the reservoir. From this it passes by the oil-pipe G to the bottom of the next subjacent filtering-chamber D and is discharged centrally from the outlet of the pipe beneath the center of the perforated false bottom I. Thence it rises in globules or small particles through the water K, passes through the charcoal filter L, and rises to the top of the filtering-chamber. From thence it is conducted by means of the oil-pipe G' to the bottom of the next subjacent filtering-chamber and is discharged beneath the perforated false bottom I and goes through the same clarifying process by rising through the water in particles, as already indicated when referring to filtering-chamber D. There are preferably three of these filtering-chambers containing the perforated false bottoms and charcoal filter, but the number may be increased or diminished, as may be found expedient. After passing through the last of the animal-charcoal filters the oil is conducted down the oil-pipe G' to the bottom of the filtering-chamber $D^3$, which is at the bottom of the series. This bottom filtering-chamber is preferably larger in size than the other filtering-chambers, and a larger space is left for the oil between the top of the water and the top of the chamber. The oil may be drawn off from this lower filtering-chamber by the oil-tap E, located at the top thereof, when it is required for use.

What I claim as my invention is—

1. In an oil-reservoir, the combination of an unfiltered-oil reservoir, a series of filtering-chambers superimposed upon each other and adapted to contain both oil and water, each of said chambers being provided with a perforated false bottom extending entirely across it and adapted to separate or break up the oil into small particles, a filter in each of said chambers, oil-pipes on the outside of the chambers arranged to conduct the oil from the unfiltered-oil reservoir to the bottom of the filtering-chamber immediately subjacent, and for conducting the oil from the upper part of each filtering-chamber to the lower part of the next subjacent filtering-chamber and under its perforated false bottom, cocks for withdrawing the oil, and means for regulating the flow of the unfiltered oil, substantially as described.

2. In an oil-filter, the combination with an unfiltered-oil reservoir A, a ledge $e$ near the bottom thereof, a sawdust filter B resting on said ledge $e$, filtering-chambers D, D', $D^2$ and $D^3$, each provided with a perforated false bottom I, a packing-ring J supporting the packing $j$ and charcoal filter L, and an oil-pipe arranged on the outside of the filter to conduct the oil from the oil-reservoir underneath the perforated false bottom of the first filtering-chamber, oil-pipes arranged on the outside in each of the chambers and arranged to conduct the oil from the upper part of each filtering-chamber to the lower part of the next subjacent filtering-chamber and under its false bottom, and a regulating-valve H controlling the oil from the oil-reservoir, substantially as shown and described.

Hamilton, August 31, 1895.

ALLAN THOMAS MORROW.

In presence of—
  W. T. EVANS,
  HENRY CARPENTER.